United States Patent
Johnson et al.

(10) Patent No.: US 9,124,096 B2
(45) Date of Patent: Sep. 1, 2015

(54) PROCESS CONTROL FIELD DEVICE WITH CIRCUITRY PROTECTION

(75) Inventors: James A. Johnson, Savage, MN (US); Richard L. Nelson, Chanhassen, MN (US)

(73) Assignee: Rosemount Inc., Eden Prairie, MN (US)

( * ) Notice: Subject to any disclaimer, the term of this patent is extended or adjusted under 35 U.S.C. 154(b) by 533 days.

(21) Appl. No.: 13/285,307

(22) Filed: Oct. 31, 2011

(65) Prior Publication Data
US 2013/0107406 A1     May 2, 2013

(51) Int. Cl.
| | |
|---|---|
| *H02H 3/00* | (2006.01) |
| *H02H 11/00* | (2006.01) |
| *H02J 7/00* | (2006.01) |
| *H02H 3/20* | (2006.01) |
| *H02H 3/18* | (2006.01) |

(52) U.S. Cl.
CPC .......... *H02H 11/002* (2013.01); *H02H 3/202* (2013.01); *H02H 11/003* (2013.01); *H02J 7/0034* (2013.01); *H02H 3/18* (2013.01); *H02H 11/006* (2013.01)

(58) Field of Classification Search
USPC .......................................................... 361/90
See application file for complete search history.

(56) References Cited

U.S. PATENT DOCUMENTS

| | | | |
|---|---|---|---|
| 3,048,718 A * | 8/1962 | Starzec et al. ............... 361/91.6 |
| 3,571,608 A | 3/1971 | Hurd | |
| 3,956,708 A * | 5/1976 | Musa ........................... 330/253 |
| 4,723,191 A * | 2/1988 | Menniti ......................... 361/92 |
| 5,337,208 A * | 8/1994 | Hossner ....................... 361/93.7 |
| 5,513,060 A * | 4/1996 | Bremond ....................... 361/58 |
| 6,208,187 B1 * | 3/2001 | Callahan, Jr. ................. 327/206 |
| 6,606,227 B2 * | 8/2003 | Rapsinski et al. ............. 361/86 |
| 6,611,410 B1 * | 8/2003 | Makaran ....................... 361/84 |
| 7,680,460 B2 | 3/2010 | Nelson et al. | |
| 7,852,271 B2 | 12/2010 | Grunig et al. | |
| 8,330,499 B2 * | 12/2012 | Hirose et al. .................. 327/65 |
| 2002/0109952 A1 * | 8/2002 | Rapsinski et al. ............. 361/86 |
| 2002/0171298 A1 * | 11/2002 | Chen et al. .................... 307/127 |

(Continued)

FOREIGN PATENT DOCUMENTS

| | | |
|---|---|---|
| EP | 0 495 142 A1 | 7/1992 |
| JP | 2005-51919 | 2/2005 |
| JP | 2008-109646 | 5/2008 |

OTHER PUBLICATIONS

International Search Report and Written Opinion for PCT Application No. PCT/US2012/061834, dated Mar. 20, 2013, 9 pages.
First Chinese Office Action for Chinese Patent Application No. 201210062943.8, dated Jul. 10, 2014, 17 pages.

(Continued)

*Primary Examiner* — Ronald W Leja
(74) *Attorney, Agent, or Firm* — Westman, Champlin & Koehler, P.A.

(57) ABSTRACT

A wireless field device for use in an industrial process control system includes a power source having a power source output. Field device is circuitry powered by the power source output. A protection circuit is configured to protect the field device circuitry. The protection circuit include reverse polarity protection circuit coupled to the power source output that electrically isolates the power source output from the field device circuitry in response to a reverse polarity connection between the power source output and the field device circuitry. An overvoltage protection circuit disconnects the power source output from the field device circuitry is a voltage of the power source output exceeds a threshold.

16 Claims, 5 Drawing Sheets

(56) References Cited

U.S. PATENT DOCUMENTS

| | | |
|---|---|---|
| 2005/0245291 A1 | 11/2005 | Brown et al. |
| 2009/0097181 A1* | 4/2009 | Tamegai ............... 361/91.5 |
| 2010/0188785 A1 | 7/2010 | Gascuel |
| 2013/0029527 A1* | 1/2013 | Mullins ................ 439/620.21 |
| 2013/0107406 A1* | 5/2013 | Johnson et al. ............ 361/84 |

OTHER PUBLICATIONS

Communication pursuant to Rules 161(1) and 162 EPC for European Patent Application No. 12809375.4-1806, dated Jun. 18, 2014, 2 pages.

Office Action from Japanese Application No. 2014-539990, dated Mar. 24, 2015.

* cited by examiner

PROCESS CONTROL FIELD DEVICE WITH CIRCUITRY PROTECTION

BACKGROUND OF THE INVENTION

The present invention relates to industrial process control and monitoring systems. More specifically, the present invention relates to wireless field devices used in such systems.

In industrial settings, control and monitoring systems are used to monitor and control inventories of industrial and chemical processes, and the like. Typically, the control system performs these functions using field devices distributed at key locations in the industrial process and coupled to control circuitry in the control room by a process control loop. The term "field device" refers to any device that performs a function in a distributed control or process monitoring system, including all devices used in the measurement, control and monitoring of industrial processes.

Field devices are used by the process control and measurement industry for a variety of purposes. Usually, such devices have a field-hardened enclosure so that they can be installed outdoors in relatively rugged environments and are able to withstand climatological extremes of temperature, humidity, vibration, mechanical shock, et cetera. These devices also can typically operate on relatively low power. For example, field devices are currently available that receive all of their operating power from a known 4-20 mA loop.

Some field devices include a transducer. A transducer is understood to mean either a device that generates an electrical output based on a physical input or that generates a physical output based on an electrical input signal. Typically, a transducer transforms an input into an output having a different form. Types of transducers include various analytical equipment, pressure sensors, thermistors, thermocouples, strain gauges, flow transmitters, positioners, actuators, solenoids, indicator lights, and others.

Typically, each field device also includes communication circuitry that is used for communicating with a process control room, or other circuitry, over a process control loop. In some installations, the process control loop is also used to deliver a regulated current and/or voltage to the field device for powering the field device.

Traditionally, analog field devices have been connected to the control room by two-wire process control current loops, with each device being connected to the control room by a single two-wire control loop. Some analog field devices transmit a signal to the control room by modulating the current running through the current loop to a current that is proportional to a sensed process variable. Other analog field devices can perform an action under the control of the control room by controlling the magnitude of the current through the loop. In addition to, or in the alternative, the process control loop can carry digital signals used for communication with field devices. Digital communication allows a much larger degree of communication than analog communication. Moreover, digital devices also do not require separate wiring for each field device. Field devices that communicate digitally can respond to and communicate selectively with the control room and/or other field devices. Further, such devices can provide additional signaling such as diagnostics and/or alarms.

In some installations, wireless technology is used to communicate with field devices. A wireless configuration simplifies field device wiring and setup. Various wireless communication techniques can be employed including a mesh network type configuration. One example wireless communication protocol is Wireless HART® in accordance with the IEC 62591 standard. However, as there are no physical electrical connections to the wireless field device, the wireless field devices are typically required to operate using relatively little power. Low powered components and modules of such devices can be damaged if they are improperly connected to a power source, or connected to a power source having an output voltage which exceeds the limits of the component or module.

SUMMARY

A wireless field device for use in an industrial process control system includes a power source having a power source output. Field device is circuitry powered by the power source output. A protection circuit is configured to protect the field device circuitry. The protection circuit includes reverse polarity protection circuitry coupled to the power source output that electrically isolates the power source output from the field device circuitry in response to a reverse polarity connection between the power source output and the field device circuitry. An overvoltage protection circuit disconnects the power source output from the field device circuitry if a voltage of the power source output exceeds a threshold.

DETAILED DESCRIPTION

The present invention includes a wireless field device having a protection circuit to protect circuitry of the field device. The protection circuit prevents a reverse polarity connection between field device circuitry and a power source. Further, the protection circuitry prevents the field device circuitry from being coupled to a power source having a voltage which exceeds a maximum voltage of the field device circuitry.

Figure 1:
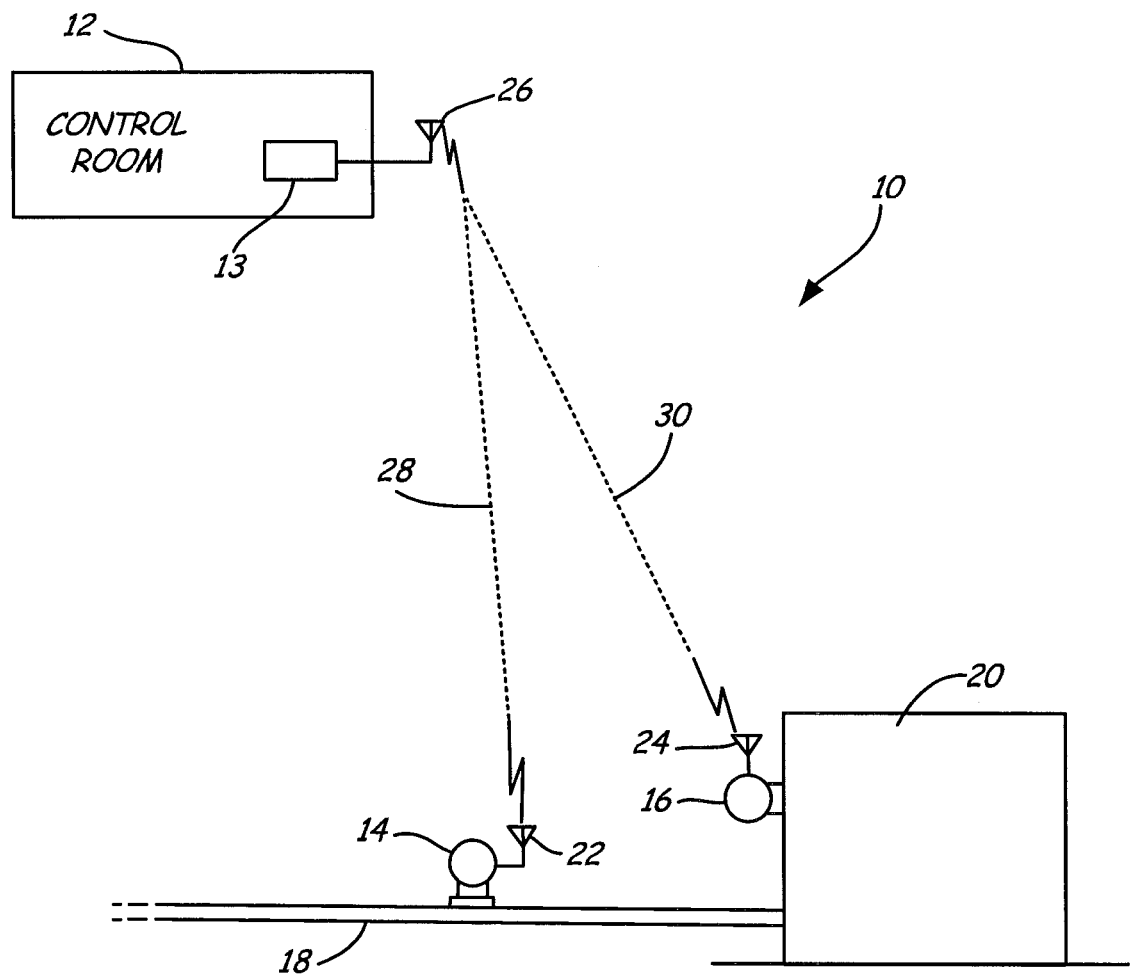
FIG. 1 is a simplified block diagram showing a process control or monitoring system including wireless field device which include circuitry in accordance with the present invention.

FIG. 1 is a simplified diagram showing an example process control or monitoring system 10 which includes a control room or control system 12 coupling to field devices 14 and 16. Field device 14 is shown coupled to process piping 18 and field device 16 is shown coupled to storage tank 20. Devices 14 and 16 include antennas 22 and 24, respectively, for transmitting and/or receiving information from antenna 26 associated with process control circuitry 13 of process control room 12. Devices 14 and 16 communicate using wireless radio frequency (RF) communication links 28 and 32 with circuitry 13 in control room 12. Field devices 14 and 16 include components to provide local power to the devices without requiring running additional wires. For example, device 14 and 16 can include solar cells and/or batteries for local power.

In order to reduce power usage, many components in wireless field devices are designed to operate with power supplies that provide a low voltage output. This improves the energy efficiency of the device and extends the operating time in the case of battery powered devices. For example, some wireless devices include circuitry configured to operate using a relatively low voltage power source, such as 7.2 volts. However, other devices and components may operate using higher voltages. For example, "legacy" devices may be designed to operate using power supply voltages ranging from 18 volts to as high as 50 volts. The components that are designed for low voltage operation typically cannot tolerate the higher voltages that are used in legacy devices. There is a potential that these existing higher voltages may be connected to the newer lower voltage designed components. This can result in damage to the low voltage components.

Figure 2:
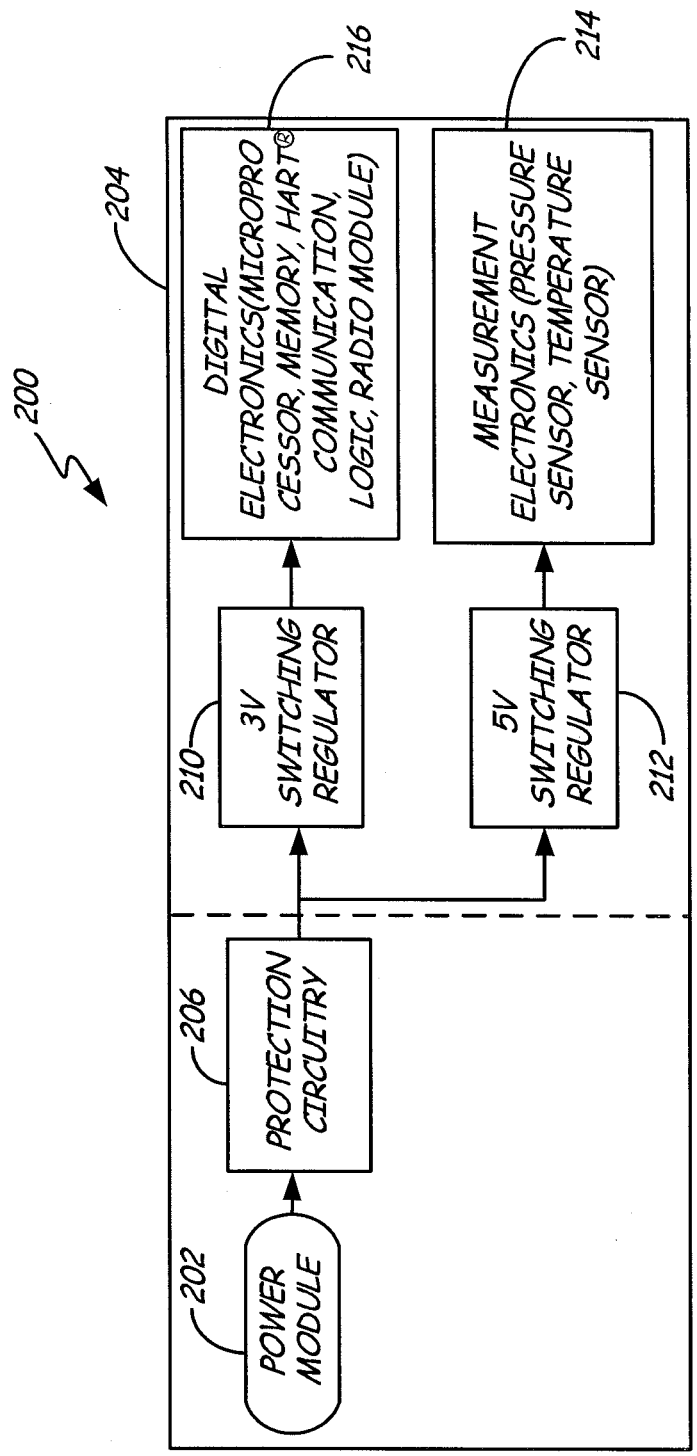
FIG. 2 is a block diagram showing components in a wireless field device.

FIG. 2 is a simplified block diagram of one example system architecture of a wireless field device 200. Device 200 includes a power module 202, device circuitry 204 and protection circuitry 206. Example power sources for power module 202 include batteries and storage capacitors as well as electrical generators such as solar cells, mechanical to electrical power sources, etc. In this example, device circuitry 204 includes a 3 volt switching regulator 210 and a 5 volt switching regulator 212. Measurement circuitry 214 is configured to measure a process variable of the industrial process such as pressure, temperature, etc. and includes a sensor such as a pressure sensor, temperature sensor, etc. Digital electronics 216 are configured to receive the measured process variable and communicate the process variable to a remote location. For example, the digital electronics 216 may comprise a microprocessor, memory, communication circuitry including a radio module, etc.

In a prior art configuration, the protection circuitry 206 may comprise reverse polarity circuitry configured to prevent the device circuitry 204 from being connected to power module 202 with a reverse polarity. Power module 202 may comprise any suitable power source for use with a wireless field device. The power module 202 is one example of a power source and, more specifically, an internal power source which is capable of providing power to the field device wherein the field device may be powered exclusively with power from the internal power source.

Figure 3:
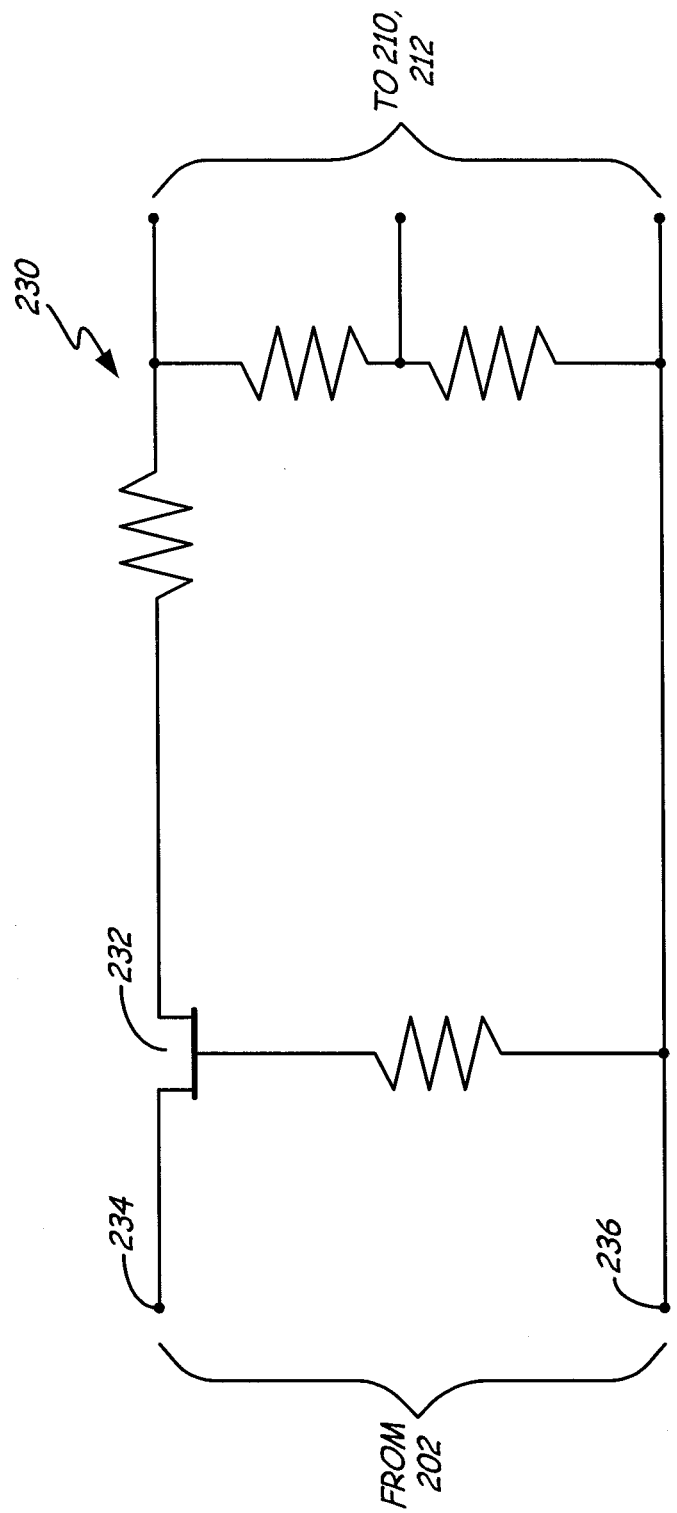
FIG. 3 is a diagram of a prior art reverse polarity protection circuit of FIG. 2.

FIG. 3 is a simplified block diagram of a prior art protection circuit 230 configured to provide reverse polarity protection. Protection circuitry 230 receives power from power module 202 and provides power to switching regulator 210 and 212 shown in FIG. 2. In the configuration of FIG. 3, a transistor 232 comprises a P-channel MOSFET. In normal operation, terminal 234 is connected to a positive terminal of the power module 202 and terminal 236 is connected to a negative terminal of the power module 202. In this configuration, the transistor 232 will be in an "on" condition because the gate to source voltage is sufficiently large. In contrast, when the power module 202 is connected to terminals 234 and 236 with the opposite polarity, the transistor 232 will turn off thereby preventing the voltage from being applied to device circuitry 204. This is because the voltage at the source terminal of transistor 232 will be pulled negative with respect to the gate of transistor 232.

Figure 4:
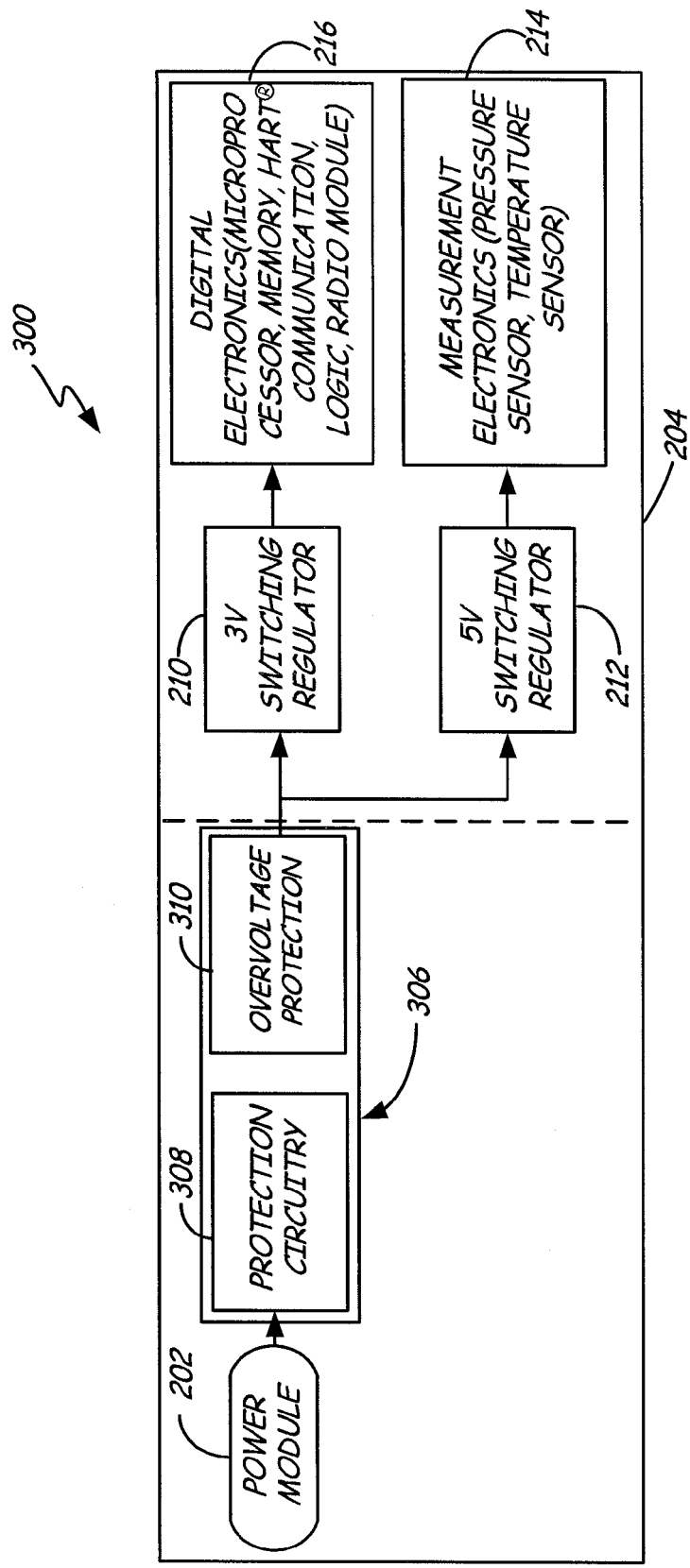
FIG. 4 is a block diagram showing components of a wireless field device in accordance with one embodiment of the present invention.

FIG. 4 is a simplified block diagram of a wireless transmitter 300 in accordance with the present invention. Elements in transmitter 300 which are similar to those shown in transmitter 200 of FIG. 2 have retained their numbering. In the configuration shown in FIG. 4 of transmitter 300, the protection circuit 206 of transmitter 200 shown in FIG. 2 has been replaced by a protection circuit 306 in accordance with the present invention. Protection circuit 306 provides reverse polarity protection as discussed above using reverse polarity protection circuitry 308. Additionally, protection circuit 306 provides overvoltage protection using overvoltage protection circuitry 310. Overvoltage protection circuitry prevents a power module 202 having a voltage which could damage device circuitry 204 from being coupled to device circuitry 204.

Figure 5:
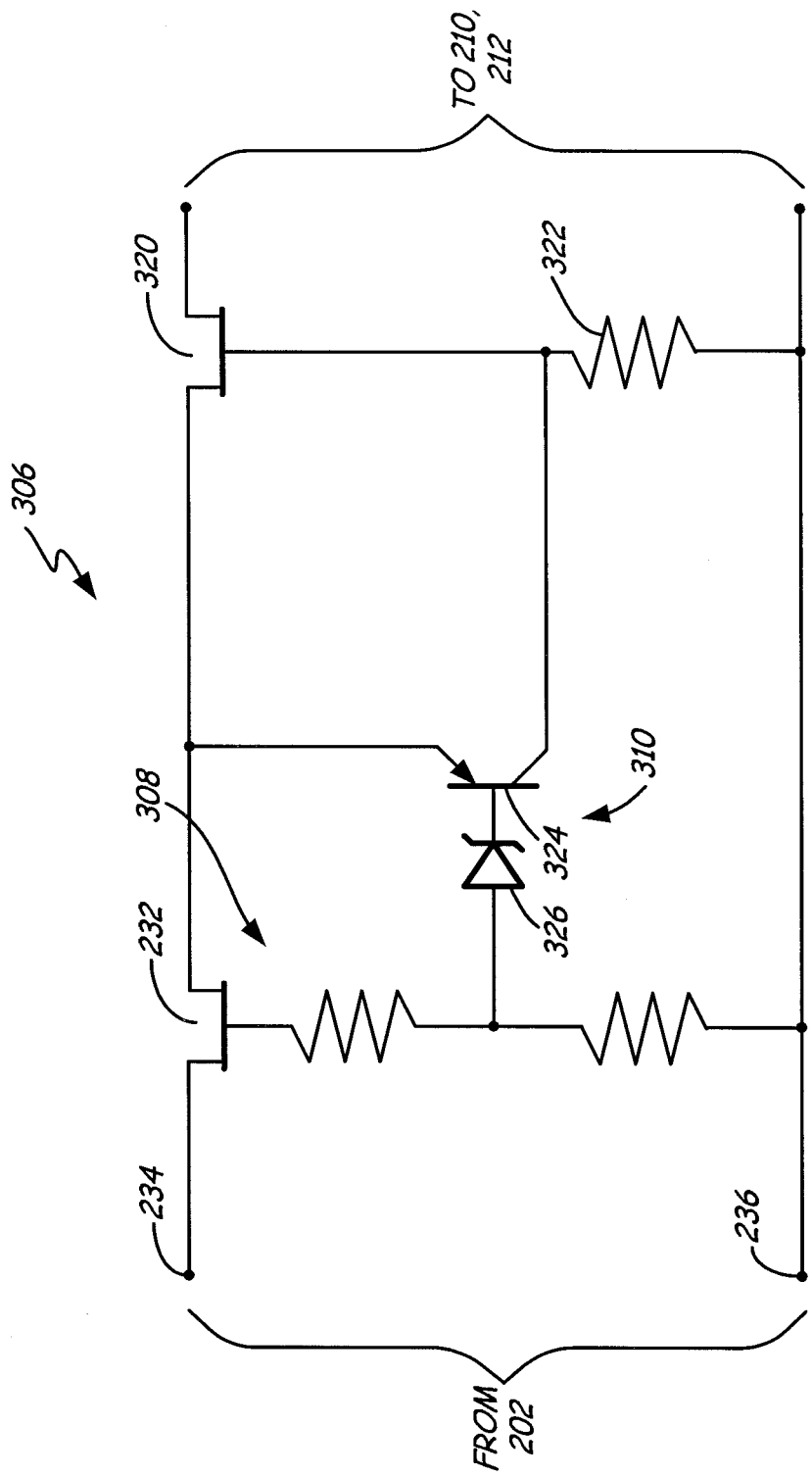
FIG. 5 is a simplified schematic diagram showing protection circuitry including an overvoltage protection circuit.

FIG. 5 is a more detailed view of protection circuitry 306. Elements of protection circuitry 306 which are similar to elements of protection circuitry 230 shown in FIG. 3 have retained their numbering. In protection circuitry 306 of FIG. 5, the reverse polarity protection circuit 308 operates as discussed above in connection with FIG. 3. Protection circuitry 306 further includes overvoltage protection circuitry 310. Overvoltage protection circuitry 310 includes a MOSFET 320, a resistor 322, a PNP transistor 324 and a zener diode 326.

During normal operation of overvoltage protection circuitry 310, MOSFET 320 is in an "on" state because resistor 322 pulls the gate of MOSFET 320 sufficiently low to exceed the gate threshold requirement. However, if the voltage applied across terminals 234 and 236 exceeds a voltage which would cause the voltage across zener diode 326 to exceed its breakdown voltage, the PNP transistor 324 will begin conducting. This will raise the voltage at the gate of MOSFET 320 causing it to stop conducting and enter a "off" state. With this transistor 320 not conducting, the high voltage applied across terminals 234 and 236 will not be connected to switching regulators 210 and 212 or to subsequent device circuitry 214 and 216. This will protect the device electronics from overvoltage so long as the applied voltage does not exceed the rated voltage of the MOSFET 320. Further, the quiescent current used by overvoltage protection circuit 310 is relatively small, for example a few micro amps, during normal operation. The threshold voltage at which the MOSFET 320 turns "off" can be adjusted by changing the breakdown voltage of zener diode 326. The circuitry can be implemented using relatively low cost components which are also relatively small and easily accommodated on a circuit board. In one configuration, the protection circuitry 306 is implemented on a "feature module" which can be coupled to device circuitry 204. For example, the feature module can provide additional functionality to device circuitry 204 such as wireless communication abilities.

Although the present invention has been described with reference to preferred embodiments, workers skilled in the art will recognize that changes may be made in form and detail without departing from the spirit and scope of the invention. Although the above description is directed to wireless field devices, the present invention can be used in connection with wired devices as well. This includes devices which are permanently wired to other circuitry as well as devices which are only temporarily wired to other circuitry.

What is claimed is:

1. A field device for use in an industrial process control system, comprising:
   a power source having a power source output;
   low power field device circuitry powered by the power source, the field device circuitry including wireless communication circuitry configured to communicate a sensed process variable of an industrial process;
   a protection circuit to protect the field device circuitry, comprising:
      a reverse polarity protection circuit comprising a reverse polarity protection transistor that electrically isolates the power source output from the field device circuitry in response to a reverse polarity connection between the power source output and the field device circuitry; and an overvoltage protection circuit that connects the power source output to the field device circuitry, the overvoltage protection circuit comprising a first transistor connected in series between the reverse polarity protection circuit and the field device circuitry, the first transistor having a gate pulled low by an electrical connection to ground through a resistor to thereby connect the power source output to the field device circuitry during normal operation, and a second transistor connected between the gate of the first transistor and the resistor, and wherein the second transistor is responsive to a voltage of the reverse polarity protection transistor to thereby conduct current when the voltage of the power source output exceeds a threshold to thereby cause the first transistor to enter an "off state".

2. The field device of claim 1 wherein the first transistor comprises a field effect transistor.

3. The field device of claim 2 wherein the field effect transistor includes a drain and a source which are coupled in series between the power source output and the field device circuitry.

4. The field device of claim 3 wherein the overvoltage protection circuit further includes a zener diode having a breakdown voltage and wherein when a voltage across the zener diode exceeds the breakdown voltage, a voltage will be applied to the gate of the field effect transistor which turns the transistor "off" thereby disconnecting the power source output from the device circuitry.

5. The field device of claim 4 wherein the second transistor couples the zener diode to the gate of the first transistor.

6. The field device of claim 1 wherein the reverse polarity protection transistor is coupled in series between the power source output and the field device circuitry.

7. The field device of claim 1 wherein the field device circuitry includes a switching regulator coupled to the protection circuit and configured to power the field device circuitry.

8. The field device of claim 1 wherein the protection circuit is carried in a feature module coupled to the field device.

9. The field device of claim 1 including wireless communication circuitry and wherein the field device operates using power exclusively from the power source.

10. A method for protecting field device circuitry in a field device of the type used in an industrial process control system, the method comprising:
   electrically coupling a power source to the low power field device circuitry which includes wireless communication circuitry;
   providing reverse polarity protection to the field device circuitry by electrically disconnecting the power source from the field device circuitry if the power source is connected with a reverse polarity using a reverse polarity protection transistor;
   connecting the power source to the field device circuitry during normal operation using a first transistor connected in series between the power source and the field device circuitry, the first transistor having a gate pulled low by a connection to electrical ground through a resistor;
   providing overvoltage protection to the field device circuitry by electrically disconnecting the power source from the field device circuitry with the first transistor by causing a second transistor coupled between the gate of the first transistor and the resistor to conduct current if a voltage of the power source output exceeds a threshold, wherein the second transistor is responsive to a voltage of the reverse polarity protection transistor; and
   wirelessly communicating a sensed process variable of the industrial process using the wireless communication circuitry.

11. The method of claim 10 wherein the threshold is selected by selecting a breakdown voltage of a zener diode.

12. The method of claim 10 wherein providing overvoltage protection includes turning the first transistor "off" when the voltage of the power source output exceeds the threshold.

13. The method of claim 10 including powering the field device circuitry using a switching regulator to regulate a voltage from the power source output.

14. The method of claim 10 including coupling a switching regulator to the power source to power the field device circuitry.

15. The method of claim 10 including coupling a feature module to the wireless field device.

16. The method of claim 10 including powering the field device exclusively with power from the power source.

* * * * *

UNITED STATES PATENT AND TRADEMARK OFFICE
CERTIFICATE OF CORRECTION

| | | |
|---|---|---|
| PATENT NO. | : 9,124,096 B2 | Page 1 of 1 |
| APPLICATION NO. | : 13/285307 | |
| DATED | : September 1, 2015 | |
| INVENTOR(S) | : Johnson et al. | |

It is certified that error appears in the above-identified patent and that said Letters Patent is hereby corrected as shown below:

On the title page item [57], line 5, change "include" to --includes--.

Signed and Sealed this
Fifth Day of April, 2016

Michelle K. Lee
*Director of the United States Patent and Trademark Office*